US008695270B2

(12) United States Patent  
Miller et al.

(10) Patent No.: US 8,695,270 B2  
(45) Date of Patent: Apr. 15, 2014

(54) METHOD FOR RECYCLING ARTIFICIAL FISHING BAITS

(76) Inventors: Robert P Miller, Holdenville, OK (US); Richard E Parks, Seminole, OK (US)

( * ) Notice: Subject to any disclaimer, the term of this patent is extended or adjusted under 35 U.S.C. 154(b) by 314 days.

(21) Appl. No.: 13/208,766

(22) Filed: Aug. 12, 2011

(65) Prior Publication Data

US 2013/0036655 A1 Feb. 14, 2013

(51) Int. Cl.  
*A01K 85/00* (2006.01)

(52) U.S. Cl.  
USPC .......................................... 43/42.53; 264/402

(58) Field of Classification Search  
USPC .............. 43/42.53, 42.24; 264/129, 161, 334, 264/338, 402; 249/108, 163, 141, 129  
See application file for complete search history.

(56) References Cited

U.S. PATENT DOCUMENTS

| | | | |
|---|---|---|---|
| 3,930,329 A * | 1/1976 | Burkhardt | 81/423 |
| 4,108,955 A * | 8/1978 | Thom | 264/222 |
| 5,494,432 A | 2/1996 | Coggins et al. | |
| 6,024,559 A | 2/2000 | Coleman | |
| 6,293,779 B1 | 9/2001 | Firmin | |
| 6,408,567 B1 | 6/2002 | Clark | |
| 6,532,694 B1 | 3/2003 | Gathright | |
| 7,104,004 B1 | 9/2006 | Renosky | |
| 8,490,321 B1 * | 7/2013 | Butz | 43/42.53 |
| 2003/0147985 A1 | 8/2003 | Kim | |

OTHER PUBLICATIONS

"How to make artificial fishing bait for little to no $", http://www.instructables.com/id/How-to-make-artificial-fishing -bait-for-little-to-/, published Apr. 24, 2010, accessed Dec. 5, 2013.*

* cited by examiner

*Primary Examiner* — Darren W Ark  
*Assistant Examiner* — Kathleen Alker  
(74) *Attorney, Agent, or Firm* — Edward L. White

(57) ABSTRACT

A method for recycling soft artificial fishing baits comprising: providing used soft artificial baits to be recycled; providing a mold having two separable sides cooperatively defining at least one cavity therein, each cavity having a shape corresponding to a desired fishing bait, fastening means, holding means, at least one vent hole; placing used soft artificial baits into the holding means; placing the mold with artificial baits in the holding means into a microwave oven; heating the mold with artificial baits in the holding means for a time sufficient to melt the baits and cause material to fill each cavity; allowing the mold to cool for a time sufficient to allow the material in each cavity to solidify; opening the mold and removing each molded bait; and cutting away any excess material that may be attached to the bait.

18 Claims, 4 Drawing Sheets

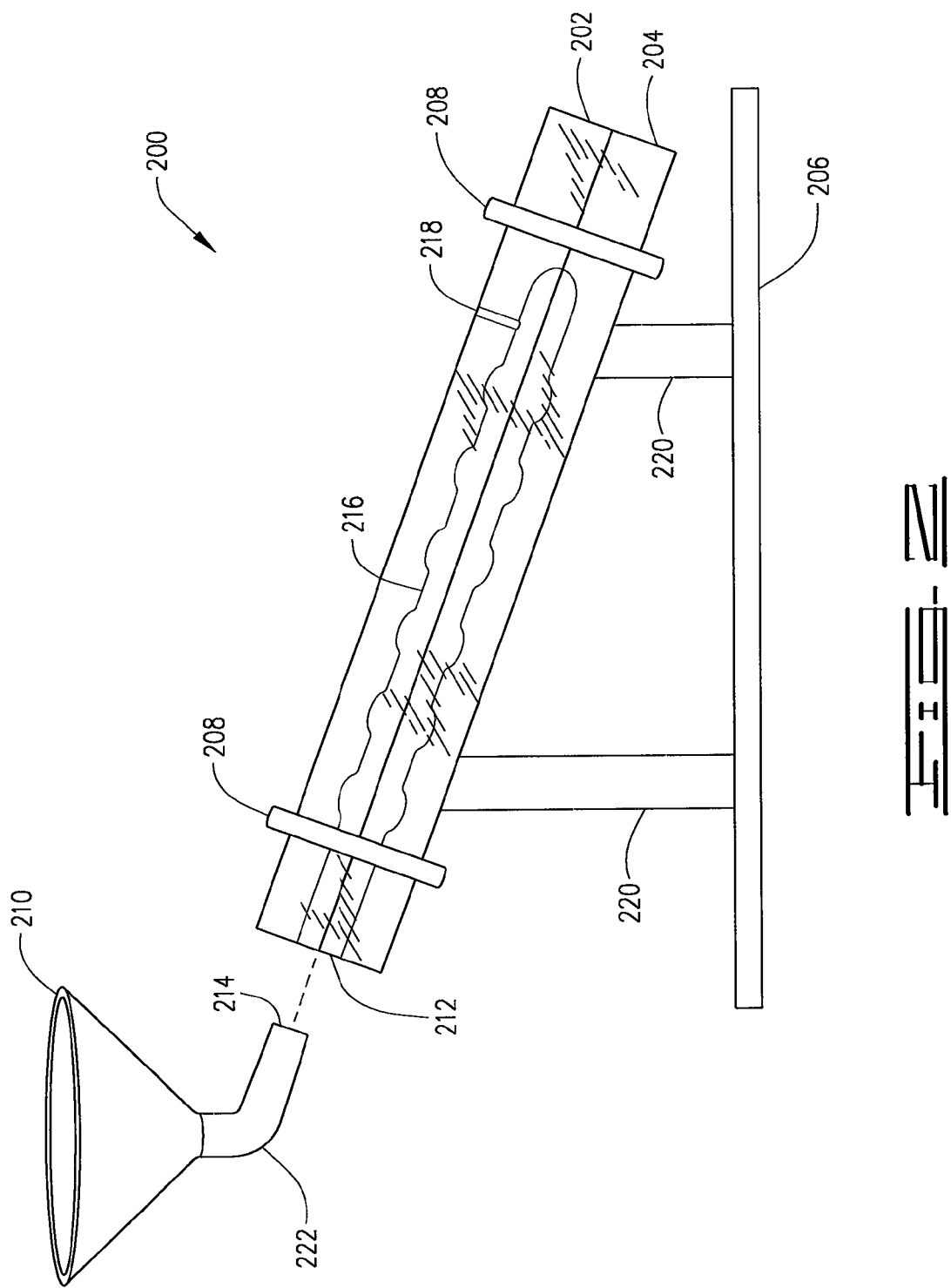

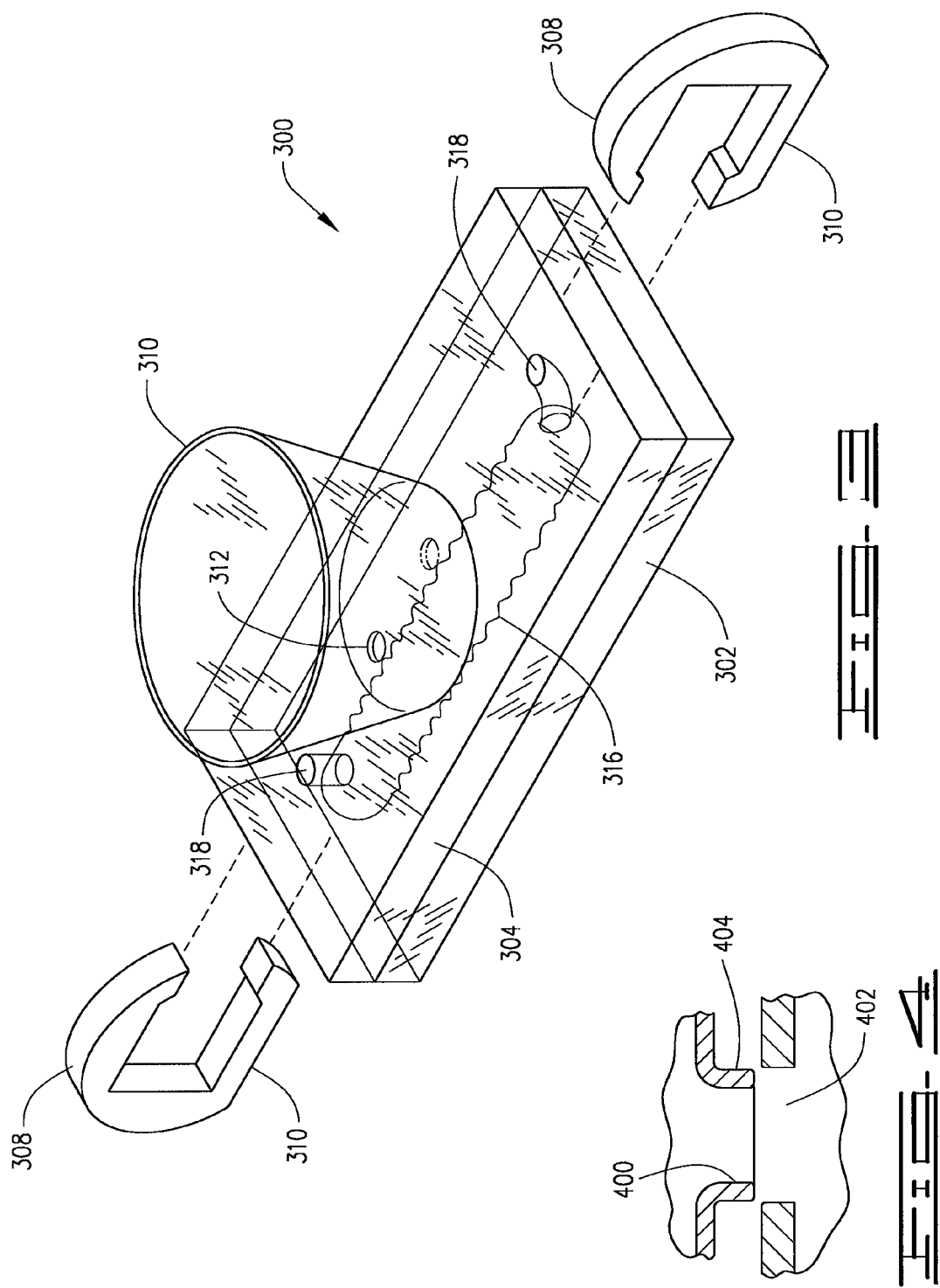

METHOD FOR RECYCLING ARTIFICIAL FISHING BAITS

CROSS-REFERENCE TO RELATED APPLICATIONS

At the time of filing this patent application, there are no related applications.

SUMMARY OF THE INVENTION

The invention relates to the field of fishing lures and, more particularly, to the field of recycling soft artificial fishing baits.

The invention includes a method for recycling soft artificial fishing baits comprising: providing used soft artificial baits to be recycled; providing a mold having—two separable sides cooperatively defining at least one cavity therein, each cavity having a shape corresponding to a desired fishing bait, fastening means for releasably affixing the sides together, holding means for receiving baits and other materials to be integrated into finished lures manufactured using the method, the holding means arranged above each cavity and in fluid communication therewith and adapted to allow material of the used baits to flow into the cavity upon heating at least one vent hole defined in each cavity near a bottom portion thereof, each hole in fluid communication with the atmosphere, each hole adapted to allow air within the cavity to flow out as material of the used baits flows into the cavity; placing used soft artificial baits into the holding means; placing the mold with artificial baits in the holding means into a microwave oven; heating the mold with artificial baits in the holding means for a time sufficient to melt the baits and cause material to fill each cavity; allowing the mold to cool for a time sufficient to allow the material in each cavity to solidify; opening the mold and removing each molded bait; and cutting away any excess material that may be attached to the bait. An inner surface of each cavity with may be coated with a material adapted to facilitate the release of a finished bait from the inner surface, and conditioning materials adapted to modify the property of the melted bait material to provide desired properties may be added to the holding means. Conditioning materials may be selected from the group of glitter, salt, glow-in-the-dark compound, pearl compound, scent, coloring, hardener, or vinyl plastisol. After the final step, each bait may be coated with a worm oil adapted to enhance the texture of the finished bait.

The mold may have its halves held together by at least one clip adapted to slidingly engage the sides. Each clip may be adapted to engage at least one groove defined in at least one of the halves. The holding means may comprise a funnel adapted to be releasably received in a cooperating portion of the mold above each cavity, and the funnel may further define at least two segmental compartments for placement of different colored baits, whereby baits having sections with more than one color may be produced. To prevent overflow of melted bait material, the mold may have a catch basin adapted to receive any excess material that may flow out of a vent hole.

The two mold pieces fit together with the funnel design to put the used baits into and when heated in the microwave the old baits change back to a liquid and gravity fills the mold cavity. The molds is preferably comprised of a transparent material, which allows a user to see the process at work. A user need not purchase any materials or extra equipment to recycle old fishing lures. A user simply places old baits in a funnel over a mold, then puts the mold into the microwave for approximately two minutes, and they have brand new baits when the material cools. The invention saves money and encourages recycling instead of waste. Many pounds of used soft plastic baits can be recycled instead of being thrown away. The recycling process can be shared with anyone, they do not have to be into fishing to enjoy doing it. You can mix and match colors and watch it create a new bait.

There have thus been outlined, rather broadly, the more important features of the invention in order that the detailed description thereof that follows may be better understood, and in order that the present contribution to the art may be better appreciated. There are, of course, additional features of the invention that will be described hereinafter and which will form the subject matter of the claims appended hereto.

In this respect, before explaining at least one embodiment of the invention in detail, it is to be understood that the invention is not limited in this application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. Additional benefits and advantages of the present invention will become apparent in those skilled in the art to which the present invention relates from the subsequent description of the preferred embodiment and the appended claims, taken in conjunction with the accompanying drawings. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

DESCRIPTION OF THE DRAWINGS

FIG. 2 is an inclined embodiment of the invention.
FIG. 3 is a horizontal embodiment of the invention.
FIG. 4 is a detail showing engagement of the funnel with the second half from FIG. 3.

DETAILED DESCRIPTION OF THE INVENTION

Figure 1:
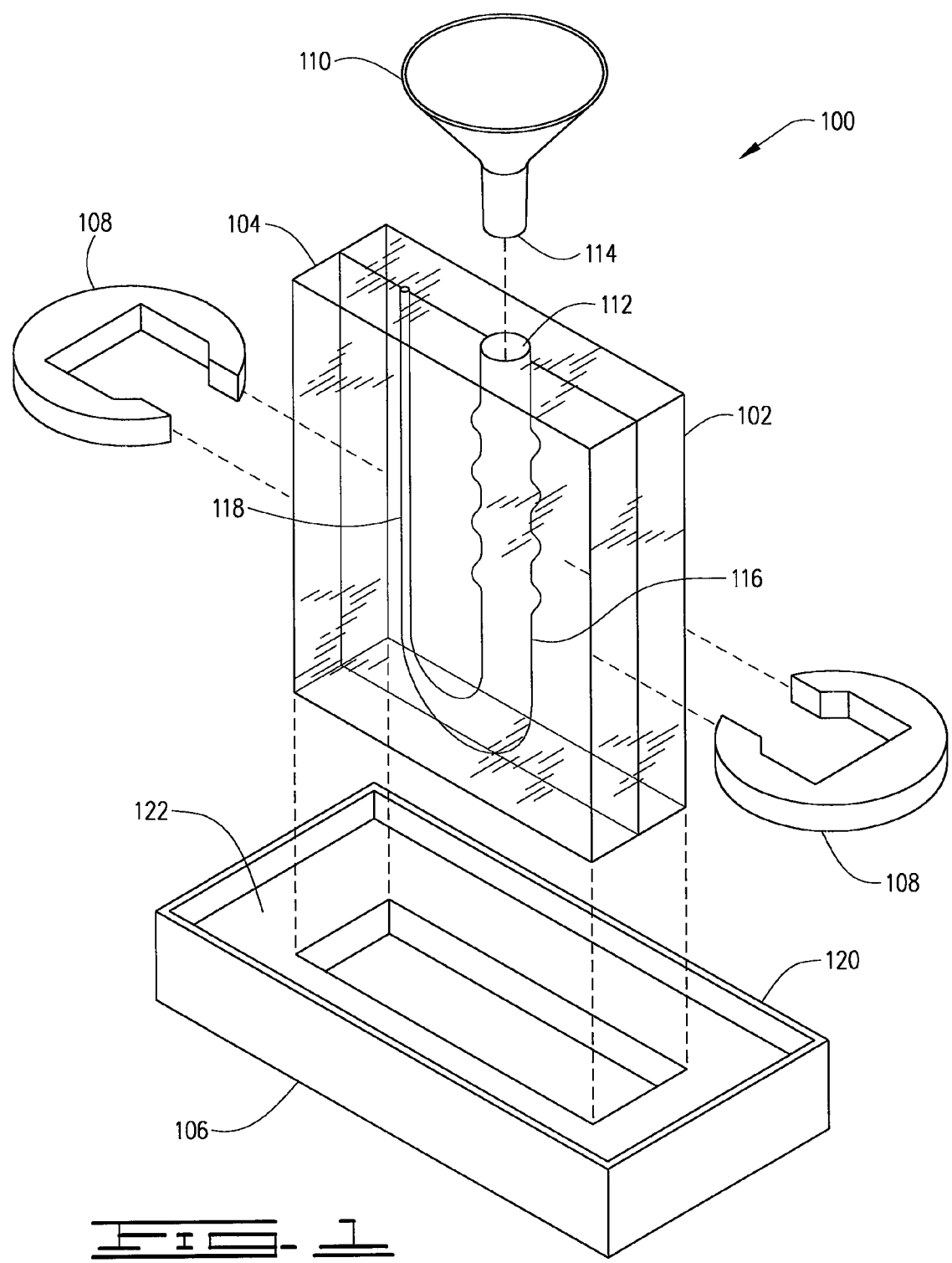
FIG. 1 is a vertical embodiment of the invention.

FIG. 1 shows a vertical embodiment of a mold 100. The mold is comprised of a first half 102 and a second half 104. The halves rest on a base 106, and one or both of the halves may be removably engaged with the base 106. At least one clamp 108 is provided to hold the halves of the mold together. In cooperation, the halves 102 and 104 define a cavity 116 having an opening 112.

The mold and other components may be composed of any microwave-safe material, but it is preferable that they be a clear polymer. If clear, a user can see the melting process take place, and they can see the melted material pass into the cavity 116. The visual feedback allows a user to simply and straightforwardly monitor the process. Few instructions are needed since the process is essentially self-explanatory.

The cavity is shaped to mimic a desired bait form such as a worm, a crawdad, a cricket or other insect, or such other shapes as may be desirable. The cavity 116 is in communication through at least one end thereof with a vent 118. As shown in FIG. 1, and as is preferable, the vent exits the mold at an upper portion thereof minimizing the amount of melted material that may flow outwardly therethrough. The purpose of the vent is to help ensure that melted material flows into terminal portions of the cavity, and if it is significantly lower than the opening, more melted material than is necessary may flow outwardly therethrough.

A funnel 110 is provided to serve as a basin for holding used baits to be recycled. The funnel includes a mouth 114 adapted to be received within the opening 112. Preferably, the fit between the mouth 114 and the opening 112 is snug so that the funnel 110 is relatively stable in a resting position above the mold 100.

The base 106 may include a basin 122 defined on an upper surface thereof by a ridge 120. If present, the basin 122 serves as a catchment for any excess melted material that flows out of the vent 118.

FIG. 2 is an inclined embodiment of the invention showing the mold 200 inclined at an angle. It again consists of a first half 202 and a second half 204. A base 206 is provided, and it may include a basin for catching excess melted material. The base for the inclined embodiment has at least one support leg 220 adapted to hold the mold 200 in an inclined position. At least one clamp 208 is preferably provided to hold the halves together. A funnel 210 with a mouth 214 is provided, but it has an angled portion 222 to accommodate the angle of the mold 200 while retaining a top of the funnel in a substantially horizontal position. The cavity 216 defined by the halves has an opening 212 adapted to receive the mouth 214. The cavity 216 is in communication with at least one vent 218.

FIG. 3 is a horizontal or flat embodiment of the invention showing the mold 300 in a substantially horizontal position. It is comprised of a first half 302 and a second half 304. A clamp 308 is provided, but this embodiment includes a clamp with a flattened portion 310 to rest on under the second half 302 and in contact with a surface on which the device rests. A relatively larger funnel 310 is provide with at least one mouth 312. In this embodiment, a plurality of mouths (two are shown) may be provided to facilitate entry of melted material into the cavity 316 at multiple points. Again, at least one vent 318 is provided.

FIG. 4 shows a specialized cooperation between a mouth 400 defined in the funnel 310, each mouth having a nipple 404 adapted to be received in a cooperating opening 402 defined in the second half 304. If more than one of the cooperating nipple 404 and opening 402 pairs are provided, the operation of the nipple will serve to fix the funnel 310 in place relative to the second half 304.

Figure 5:
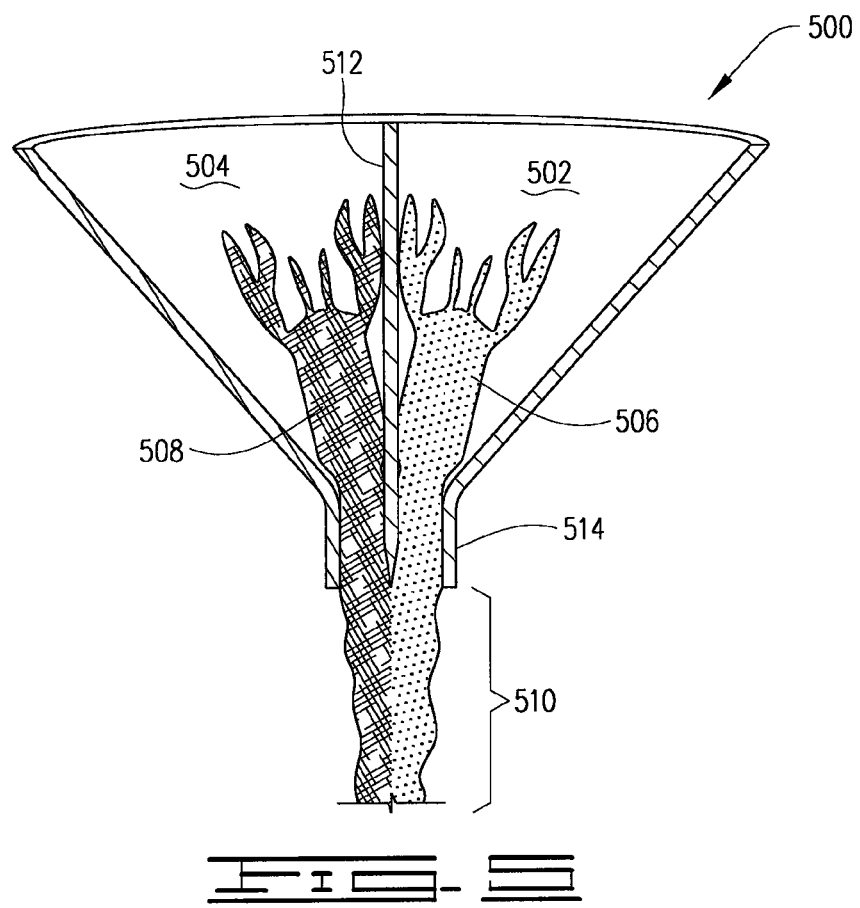
FIG. 5 shows a funnel having a divider to facilitate two-tone artificial bait manufacturing.

FIG. 5 shows a funnel 500 having a first half 502 and a second half 504 defined by a divider 512. Shown received within each half are several first color worms 506 and several second color worms 508. When melted, the worms pass through the divided mouth 514 to form a substantially divided bi-color column 510 passing into a cooperating cavity. Thus, a worm having a substantially split color scheme can be created. The same kind of dividers could be provided to divide the funnel into three or even more portions, each of which could contain a different color worm.

Figure 6:
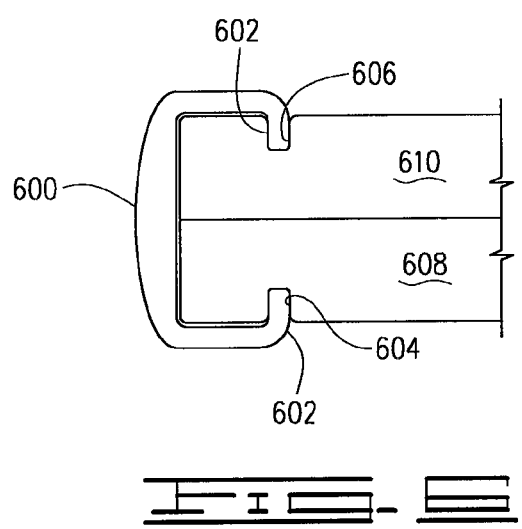
FIG. 6 is a detail drawing of a clamp engaged with cooperating grooves in the halves to hold the mold together.

FIG. 6 shows a detail of a clamp 600 having at least one tooth 602. Each tooth cooperates with a groove defined in a half. As shown, a first groove 604 and a second groove 606 cooperate with grooves defined in the first half 608 and the second half 610.

In operation, a first places at least one clamp 108 to hold the halves 102 and 104 together and, if needed, places the engaged halves onto a base 106. A user selects used baits to be recycled. They are placed into the funnel 110. The mouth 114 is engaged with the opening 112, and the entire mold, funnel, and base are set into a microwave. An appropriate time is selected: two minutes or less is usually appropriate. The microwave is engaged, and progress is preferably monitored visually. If the mold is clear, the progress can be seen as the melted material descends into the cavity 116. Even if not clear, melted material will eventually emerge from at least one vent 118 indicating that the process is complete.

The purpose of the abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application. The abstract is neither intended to define the invention of the application which is measured by the claims, nor is it intended to be limiting as to the scope of the invention in any way.

While the invention has been shown, illustrated, described and disclosed in terms of specific embodiments or modifications, the scope of the invention should not be deemed to be limited by the precise embodiment or modification therein shown, illustrated, described or disclosed. Such other embodiments or modifications are intended to be reserved especially as they fall within the scope of the claims herein appended.

We claim:

1. A method for recycling soft artificial fishing baits comprising:
   a. providing used soft artificial baits to be recycled;
   b. providing a mold having—
      i. two separable sides cooperatively defining at least one cavity therein, each cavity having a shape corresponding to a desired fishing bait,
      ii. fastening means for releasably affixing the sides together,
      iii. holding means for receiving baits and other materials to be integrated into finished lures manufactured using the method, the holding means arranged above each cavity and in fluid communication therewith and adapted to allow material of the used baits to flow into the at least one cavity upon heating,
      iv. at least one vent hole defined in each cavity near a bottom portion thereof, each hole in fluid communication with the atmosphere, each hole adapted to allow air within the at least one cavity to flow out as material of the used baits flows into the at least one cavity;
   c. placing the used soft artificial baits into the holding means;
   d. placing the mold with the artificial baits in the holding means into a microwave oven;
   e. heating the mold with the artificial baits in the holding means for a time sufficient to melt the baits and cause material to fill each cavity;
   f. allowing the mold to cool for a time sufficient to allow the material in each cavity to solidify;

g. opening the mold and removing each molded bait; and h. cutting away any excess material that may be attached to the bait.

2. The method of claim 1 adding between steps (b) and (c) the step of coating an inner surface of each cavity with a material adapted to facilitate the release of a finished bait from the inner surface.

3. The method of claim 2, further adding between steps (c) and (d) the step of further adding to the holding means conditioning materials adapted to modify the property of the melted bait material to provide desired properties.

4. The method of claim 3, the conditioning materials selected from the group of glitter, salt, glow-in-the-dark compound, pearl compound, scent, coloring, hardener, or vinyl plastisol.

5. The method of claim 1 adding, after the final step, the step of coating each bait with a worm oil adapted to enhance the texture of the finished bait.

6. The method of claim 1, the fastening means comprising at least one clip adapted to slidingly engage the sides.

7. The method of claim 6, each clip engaging at least one groove defined in at least one of the sides.

8. The method of claim 1, the holding means comprising a funnel adapted to be releasably received in a cooperating portion of the mold above each cavity.

9. The method of claim 8, the mold being set at an angle to the horizontal with the funnel having an angled portion near a mouth thereof adapted to retain a top of the funnel in a substantially horizontal position to compensate for the angle of the mold.

10. The method of claim 8, the funnel further defining at least two segmental compartments for placement of different colored baits, whereby baits having sections with more than one color may be produced.

11. The method of claim 1 where the mold is substantially horizontal and at least one cooperating pair of nipple and opening are adapted to engage the funnel with the mold.

12. The method of claim 1 where the mold and other components are comprised of a transparent polymer.

13. The method of claim 1, the mold further having a catch basin adapted to receive any excess material that may flow out of the at least one vent hole.

14. A method for recycling soft artificial fishing baits comprising:

a. providing used soft artificial baits to be recycled;

b. providing a mold having— i. two sides cooperatively, defining at least one cavity therein, each cavity having a shape corresponding to a desired fishing bait, ii. at least one clip adapted to slidingly engage the sides adapted to releasably affix the sides together, iii. a funnel adapted to be releasably received in a cooperating portion of the mold above each cavity, the funnel adapted to allow material of the used baits to flow into the at least one cavity upon heating, iv. at least one vent hole defined in each cavity near a bottom portion thereof, each hole in fluid communication with the atmosphere, each hole adapted to allow air within the at least one cavity to flow out as material of the used baits flows into the at least one cavity;

c. placing the used soft artificial baits into the funnel;

d. placing conditioning material selected from the group of glitter, salt, glow-in-the-dark compound, pearl compound, scent, coloring, hardener, or vinyl plastisol along with the baits into the funnel;

e. placing the mold with the artificial baits in the funnel into a microwave oven;

f. heating the mold with the artificial baits in the funnel for a time sufficient to melt the baits and cause material to fill each cavity;

g. allowing the mold to cool for a time sufficient to allow the material in each cavity to solidify;

h. opening the mold and removing each molded bait; and i. cutting away any excess material that may be attached to the bait.

15. The method of claim 14 adding, after the final step, the step of coating each bait with a worm oil adapted to enhance the texture of the finished bait.

16. The method of claim 14, each clip engaging at least one groove defined in at least one of the sides.

17. The method of claim 14, the funnel further defining at least two segmental compartments for placement of different colored baits, whereby baits having sections with more than one color may be produced.

18. The method of claim 14, the mold further having a catch basin adapted to receive any excess material that may flow out of the at least one vent hole.

\* \* \* \* \*